(12) United States Patent
Grieve et al.

(10) Patent No.: US 7,968,237 B2
(45) Date of Patent: Jun. 28, 2011

(54) PEM-SOFC HYBRID POWER GENERATION SYSTEMS

(75) Inventors: Malcolm James Grieve, Fairport, NY (US); Kaushik Rajashekara, Carmel, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 12/840,391

(22) Filed: Jul. 21, 2010

(65) Prior Publication Data

US 2010/0285378 A1 Nov. 11, 2010

Related U.S. Application Data

(62) Division of application No. 11/099,743, filed on Apr. 6, 2005, now abandoned.

(51) Int. Cl.
*H01M 8/06* (2006.01)
(52) U.S. Cl. ........ 429/415; 429/411; 429/535; 429/488; 429/492
(58) Field of Classification Search .................. 429/411, 429/415, 535, 488, 492
See application file for complete search history.

(56) References Cited

U.S. PATENT DOCUMENTS

| | | | | |
|---|---|---|---|---|
| 5,686,196 A | * | 11/1997 | Singh et al. | 429/411 |
| 6,294,276 B1 | * | 9/2001 | Ogino | 429/411 |
| 6,942,940 B2 | * | 9/2005 | Chen | 429/423 |
| 2003/0157390 A1 | * | 8/2003 | Keefer et al. | 429/34 |
| 2004/0247961 A1 | * | 12/2004 | Edlund | 429/22 |
| 2004/0253491 A1 | * | 12/2004 | Boudjemaa et al. | 429/17 |

FOREIGN PATENT DOCUMENTS

WO    WO 03021704 A2 *  3/2003

* cited by examiner

*Primary Examiner* — Dah-Wei D Yuan
*Assistant Examiner* — Zachary Best
(74) *Attorney, Agent, or Firm* — Thomas N. Twomey

(57) ABSTRACT

A hybrid fuel cell system comprising a solid-oxide fuel cell system, a proton exchange membrane fuel cell system, a hydrocarbon reformer and a hydrogen separator. A large PEM provides output power, such as motive power for a vehicle, using hydrogen storage that may be resupplied from a separate hydrogen refilling station or from the onboard reformer. The SOFC is preferably small and provides heat and exhaust water that, when recycled into the reformer, allow the reformer to operate endothermically without requiring atmospheric air, thus excluding nitrogen from the reformate stream. Alternatively, the reformer and SOFC are stationary at a base station and the PEM is aboard the vehicle. The SOFC and reformer have sufficient capacity to recharge hydrogen storage in the vehicle in a relatively short period of time, such as overnight.

7 Claims, 2 Drawing Sheets

PEM-SOFC HYBRID POWER GENERATION SYSTEMS

CROSS-REFERENCE TO RELATED APPLICATION

This application is a divisional application of co-pending U.S. patent application Ser. No. 11/099,743, filed Apr. 6, 2005 and entitled "PEM-SOFC HYBRID POWER GENERATION SYSTEMS", which is hereby incorporated by reference.

TECHNICAL FIELD

The present invention relates to fuel cells; more particularly, to solid-oxide fuel cells and proton exchange membrane fuel cells; and most particularly, to a hybrid system comprising a solid oxide fuel cell system and a proton exchange membrane fuel cell system sharing a common hydrocarbon fuel reformer.

BACKGROUND OF THE INVENTION

Fuel cells for combining hydrogen and oxygen to produce electricity are well known. A first known class of fuel cells includes a solid-oxide electrolyte layer through which oxygen ions migrate from a cathode to combine with hydrogen, forming water at the anode; such fuel cells are referred to in the art as "solid-oxide" fuel cells (referred to herein as SOFC). A second known class of fuel cells includes a membrane through which hydrogen ions (protons) migrate from an anode to combine with oxygen, forming water at the cathode; such fuel cells are referred to in the art as proton exchange membrane fuel cells (referred to herein as PEM). PEM are also known as polymer electrolyte membrane fuel cells. In both classes of fuel cells, electrons flow through an external circuit between the electrodes, doing electrical work in a load in the circuit.

In the prior art, an SOFC is readily fueled by "reformate" gas, which is the effluent from a catalytic hydrocarbon oxidizing reformer, also referred to herein as "fuel gas". Reformate typically includes amounts of carbon monoxide (CO) as fuel in addition to molecular hydrogen. The reforming operation and the fuel cell operation may be considered as first and second oxidative steps of the hydrocarbon, resulting ultimately in water and carbon dioxide. Both reactions are exothermic, and both are preferably carried out at relatively high temperatures, for example, in the range of 700° C. to 1000° C. An SOFC can use fuel gas containing CO with the $H_2$, the CO being oxidized to $CO_2$, whereas a PEM cannot oxidize CO; in fact, CO is a poison to the catalysts in the PEM stack. Thus CO must be removed from a reformate stream for PEM use (to near zero levels).

PEM and SOFC systems are being developed in the fuel cell art for use in transportation applications, for both primary motive power and for on-board power generation, as well as for stationary applications such as building heating and water heating. A PEM operates at about 100° C. and has a very short start-up period. The waste heat from a PEM is not of high quality because of the relatively low operating temperature. Conversely, an SOFC operates at about 800° C. and has a relatively long start-up period, but the waste heat from an SOFC is of higher quality because of the higher operating temperature. Both SOFC and PEM systems need about 10% of their power capability to power the balance of plant loads, thus affecting their net electrical capabilities.

What is needed in the art is a means for combining the advantages and minimizing the drawbacks of an SOFC and a PEM in an integrated system.

It is a principal object of the present invention to integrate an SOFC system and a PEM system as a novel hybrid system, and to fuel both from a common hydrocarbon reformer.

SUMMARY OF THE INVENTION

Briefly described, a hybrid fuel cell system in accordance with the invention comprises a solid-oxide fuel cell system and a proton exchange membrane fuel cell system. Preferably, both fuel cell systems derive their fuel from a common catalytic hydrocarbon reformer. The reformer is sized for a greater output than is required by the SOFC alone, the excess capacity being available to fuel the PEM. Recycling the high-temperature anode effluent of the SOFC through the reformer provides both heat and water, enabling the reformer to operate endothermically without requiring atmospheric air, thus excluding nitrogen from the reformate stream. This is a much more efficient way to provide a high-quality hydrogen stream for the PEM than by using treated exothermic reformate in the PEM as in the prior art.

In a first embodiment, a relatively large PEM provides the motive power for a vehicle, using hydrogen stored on board the vehicle. The hydrogen storage may be resupplied from a separate hydrogen refilling station or from the onboard reformer and SOFC. The SOFC is relatively small and provides sufficient heat and exhaust water for recycle into the reformer that the reformer operates endothermically to decompose the water and fuel without atmospheric oxygen; thus, the reformate contains no nitrogen or nitrogen oxides.

A second embodiment is similar to the first embodiment, except that the SOFC is stationary at a base station and the PEM is aboard a vehicle. The SOFC and reformer have sufficient capacity to recharge the hydrogen storage in the vehicle in a relatively short period of time, such as overnight. The SOFC also may be large enough to provide electricity and air/water heating for a building, such as a dwelling, as well as for supplying hydrogen to the PEM system and charging batteries.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
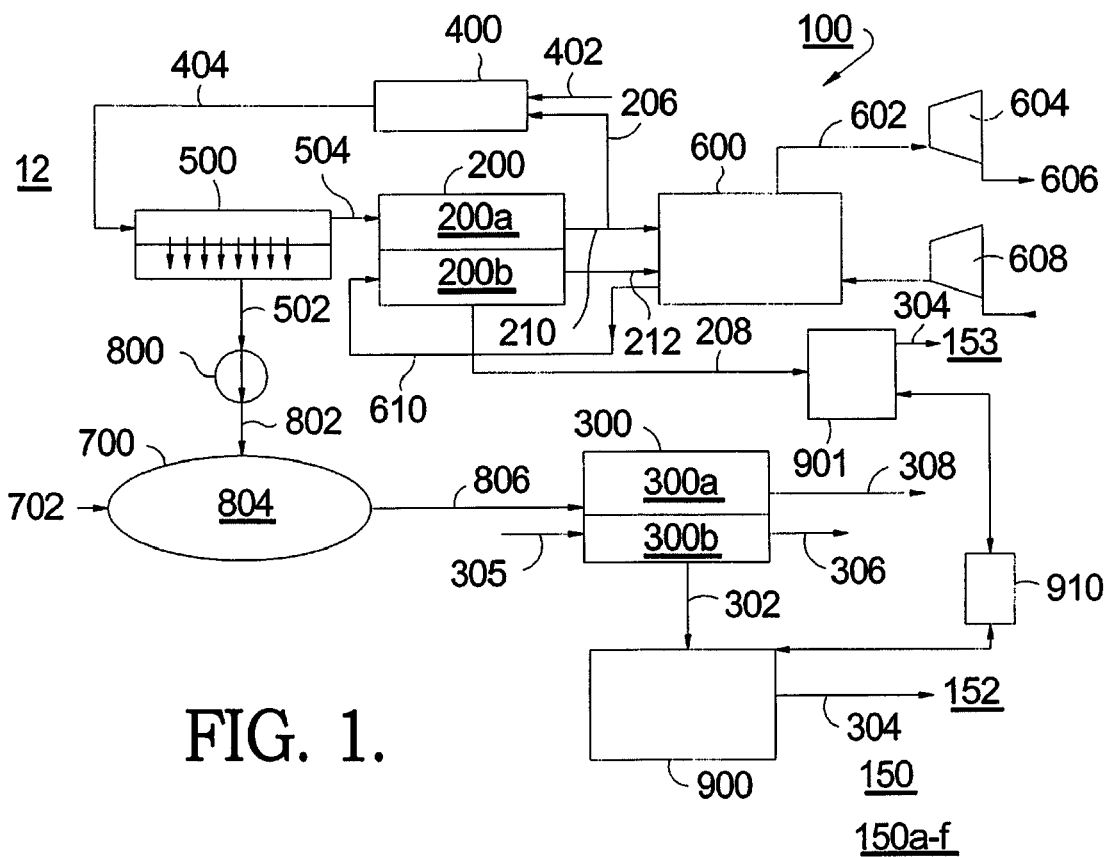
FIG. 1 is a schematic diagram of a first embodiment of a hybrid reformer/SOFC/PEM system suitable for use on a PEM-powered vehicle wherein both the SOFC and the PEM are onboard the vehicle.

Referring to FIG. 1, a first embodiment 100 of a hybrid fuel cell system in accordance with the invention comprises a solid-oxide fuel cell system 200 and a proton exchange membrane fuel cell system 300 supplied jointly by a catalytic hydrocarbon reformer 400. System 100 is useful for generating electricity, heat, and a by-product of pure hydrogen as described below. Both SOFC system 200 and PEM system 300 are preferably as are well-known in the prior art. Novelty in the present invention lies not in the fuel cell systems themselves but rather in combining them to provide an efficient, low-cost hybrid fuel cell system that efficiently provides clean hydrogen fuel for powering the PEM.

SOFC 200 comprises an anode 200a and a cathode 200b that are defined by a stack of a plurality of individual fuel cell elements, for example, 60 SOFC fuel cell elements, in known fashion. Other necessary balance of plant components such as heat exchangers, manifolding, insulation, sensors and actuators etc., are not shown. PEM 300 similarly comprises a stack of PEM fuel cell elements, including a plurality of paired anodes 300a and cathodes 300b (again, balance of plant components are not shown). A prior art hydrogen membrane separator 500 is provided for removing CO from the reformate fuel stream leading to the PEM, and a prior art post combustor 600 is provided for burning exhaust fuel from the SOFC. A hydrogen storage tank 700 is provided, along with a compressor 800. Electrical storage devices (rechargeable batteries, capacitors or a combination) 900, 901 receive the electrical output of the PEM and SOFC, respectively and provide electrical power 304 to an application 152 at high voltage levels and to an application 153 at low voltage levels. A DC/DC converter 910 allows the bi-directional conversion of power between the two voltages levels.

In first embodiment 100, SOFC 200 is preferably a relatively small unit having, for example, about 5 kW electrical output capacity or less, and PEM 300 is a relatively large unit having, for example, about 30 kW electrical output capacity or greater. System 100 may be considered, for example, an "extended range" PEM unit wherein PEM is fueled from storage tank 700 which also may be refilled "conventionally" from a hydrogen source 702, for example, a hydrogen filling station (not shown).

In operation, reformer 400 receives hydrocarbon fuel 402 and wet, recycled anode effluent 206 from SOFC 200 and catalytically, and preferably endothermically, reforms fuel 402 into a fuel gas reformate stream 404 comprising $H_2$ and CO at an exhaust temperature typically above about 700° C. Within hydrogen membrane separator 500, such as a palladium membrane separator or a pressure swing adsorption (PSA) separator, a first portion 502 of stream 404 passes through the separator, exiting as a pure hydrogen stream. First portion 502 is compressed by compressor 800 to provide a compressed stream 802 of hydrogen for storage in tank 700, either as compressed hydrogen or as a hydride 804, in known fashion. Tank 700 also may be filled from a hydrogen source 702 as described above. A metered hydrogen stream 806 is fed to the anode side 300a of PEM 300, and a metered air stream 305 is fed to the cathode side 300b of PEM 300, in known fashion. PEM 300 generates heat 308, electric power 302 and an exhaust stream 306, containing water, from the cathode side. This water may be condensed and recirculated into reformer 400 (not shown) to augment endothermic reforming and enhance hydrogen levels in reformate 404. In hydrogen separator 500, a second portion 504 of reformate stream 404 sweeps the rejected CO from the separator and passes into anode side 200a of SOFC 200 where the $H_2$ and CO contained therein reacts with oxygen to produce electricity 208. Spent exhaust 210 and cathode air 212 pass into combustor 600 wherein they are burned to generate a high-temperature exhaust 602. This high-temperature exhaust may be used optionally for driving a turbine 604, and residual thermal energy 606 may be recovered as a co-product (for example for steam generation, water heating, space heating etc.). Further, combustor 600 may be configured as a combustor/heat exchanger, and a blower or compressor 608 may be employed to drive heated air 610 to the cathode inlet of SOFC 200.

System 100 may be, for example, a fuel cell system onboard a platform generally referred to as 150, including a motor vehicle 150a, boat 150b or ship 150c, aircraft 150d, spacecraft 150e, or building 150f wherein PEM 300 is the high power source, operating intermittently to supply electrical power 302 to electrical storage device 900 which feeds power 304 to application 152 which may be vehicle drives or other primary power consumers. System 100 can, for example, extend the between-fillings range of an automotive vehicle 150 by on-board generation of hydrogen 502. SOFC 200 does the base load, heating, and hydrogen generation and may recharge the high voltage electrical storage device via the DC/DC converter 910 at a low rate (when the PEM is off). PEM 300 and electrical storage devices 900 do peak loads. During periods of low power demand, PEM 300 may be shut down and the hydrogen supply may be refueled via stream 502,802. Self-refueling by generating hydrogen onboard allows a smaller amount of hydrogen to be stored on a vehicle, because the vehicle range is then largely determined by the fuel capacity of a conventional hydrocarbon fuel tank (not shown). However, when the hydrogen storage tank 700 and the conventional fuel tank are both filled, a vehicle so equipped has a greater range than when fueled by either one alone.

Only one reformer 400 is required for both fuel cell systems 200,300 and it may be relatively small compared to the peak system power because it may be sized to reflect little more than the average power of the system. The reformer is sized for the SOFC system plus an amount to produce the by-product hydrogen stream 502 to supply the PEM. This is especially attractive for residential and light duty automotive systems where the average power is much less than the peak power of the system. Because a PEM fuel cell can start generating electricity much faster than an SOFC, the PEM 300 can provide initial power for all the accessories of the SOFC until the SOFC gets up to operating temperature. In addition, the high-temperature heat from the SOFC and combustor 600 may be used for cogeneration or for heating purposes and optionally to maintain the PEM fuel cell at a constant stand-by temperature.

In a motor vehicle example 150a, a known gasoline/electric hybrid automobile comprises a low-voltage (14 V) system for operating auxiliary motors, solenoids, lights, etc. and a high-voltage (280 V) system for motive power via electric motors. An internal combustion engine (ICE) starts and runs automatically to recharge the main operating electrical storage devices as needed. A hybrid fuel cell system in accordance with the invention could replace the ICE. The auxiliary systems could run off of electrical storage devices 901 and the electric drive motors off of electrical storage devices 900. The SOFC 200 might be sized, for example, to generate 2.0 kW@14 V, and the PEM sized to generate 60 kW@280 V, giving a power ratio of about 1:30 for SOFC:PEM.

The bi-directional DC/DC converter allows the vehicle to be run very efficiently on power generated solely by the SOFC, with the PEM powered down, at low speed driving such as in traffic, wherein the output of the SOFC can be up-converted continuously from high voltage electrical storage devices 901 to low voltage electrical storage devices 900.

Bi-directional conversion is also very useful in starting the vehicle after a prolonged shutdown, such as overnight, in cold weather. The PEM can start quickly from its hydrogen storage tank and down-convert power to help battery 901 operate the accessories and get the SOFC running.

The low voltage system may move up to 42 V for higher end vehicles in the future. One of the decision points for whether to move to 42 V is the use of electric air-conditioning via the lower-voltage storage device circuit. All other motors and solenoids, for cooling fans, blowers, door locks, and the like, as well as new functions such as drive-by-wire, brake-by-wire, and steer-by-wire benefit in weight and efficiency from running at higher voltage. Thus, a full-function luxury vehicle might generate 10 kW with an SOFC at 42 V, and 120 kW with a PEM at 420 V, giving a power ratio of about 1:12 for SOFC:PEM.

SOFC:PEM power ratios between about 1:1 and about 1:100 are most useful for applications of hybrid fuel cell systems in accordance with the invention.

Figure 2:
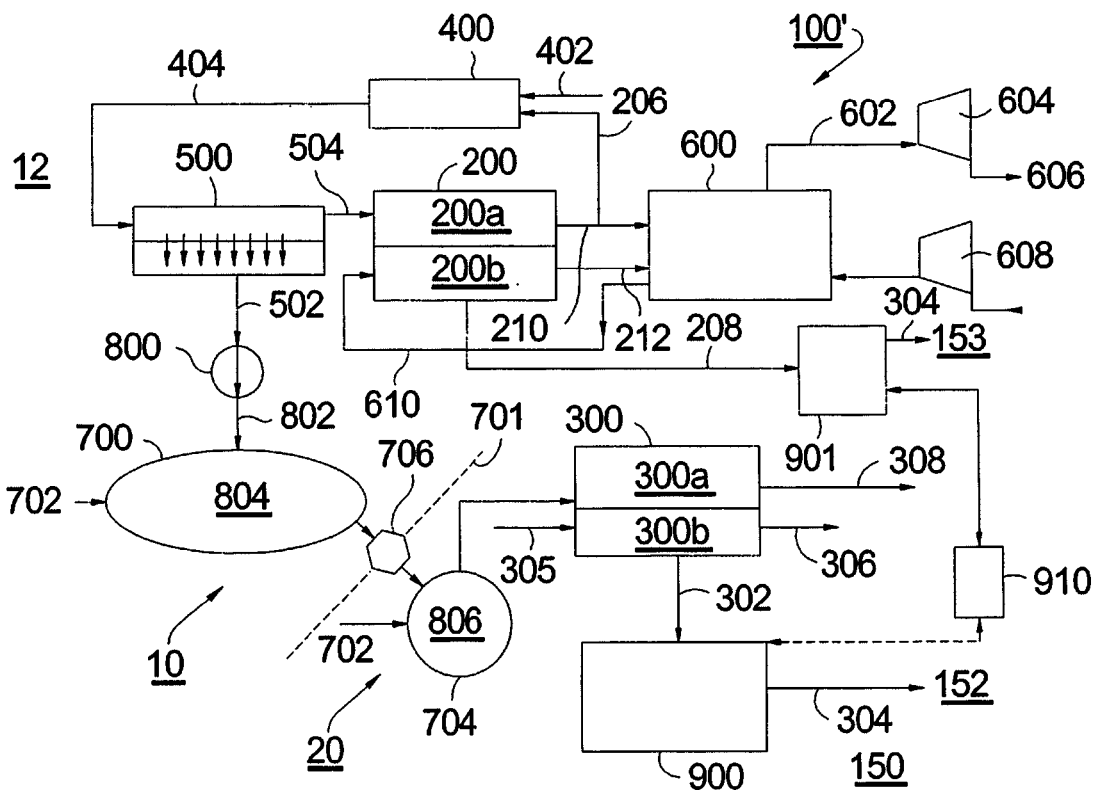
FIG. 2 is a schematic diagram of a second embodiment of a hybrid reformer/SOFC/PEM system wherein the SOFC is a stationary base station and the PEM is disposed in a vehicle that docks at the base station.

Referring to FIG. 2, a second embodiment 100' of a hybrid fuel cell system in accordance with the invention is similar in layout to first embodiment 100. However, SOFC 200, reformer 400, hydrogen membrane separator 500, combustor 600, compressor 800, and storage tank 700 together define a stationary base station 10; and PEM 300, battery 900 and an onboard storage tank 806 define a portable station 20. Preferably, SOFC 200 again is sized to have relatively low electrical capacity, for example, 5 kW, and PEM 300 is sized to have relatively high capacity, for example 30 kW. The difference from embodiment 100 is that the SOFC base station 10 is carried on a stationary platform such as, for example, a residence or place of business 12, whereas PEM 300 is carried aboard a portable platform such as 150a, 150b, 150c, 150d and 150e. Thus, base station 10 exists primarily as a source of pure hydrogen for refilling a portable fuel tank 704 with onboard hydrogen 806 from storage tank 700 via a coupling 706 (base station 10 and portable station 20 being separable and joinable along line 701) during periods when the portable platform is available to the base station, for example, at nights or on weekends. Of course, portable fuel tank 704 may also be refueled as in embodiment 100 from a remote filling station 702. High grade waste heat from the SOFC may be used for space heating, water heating, pool heating, vehicle cabin heating, and the like. Because the PEMs in either of embodiments 100,100' may be refueled from either reformer 400 or from a remote hydrogen source 702, these hybrid systems are not dependent upon the availability of a hydrogen-delivery infrastructure of filling stations, allowing a gradual transition to such an evolving infrastructure while operating on conventional hydrocarbon fuels via the reformer.

A hybrid fuel cell system in accordance with the invention has several advantages over either an SOFC system or a PEM system by itself.

a) The SOFC and PEM may be sized to obtain the best overall efficiency based on their joint operation.

b) Only one reformer is required for both fuel cell systems.

c) The reformer and hydrogen storage system may be relatively small, sufficient for short term operation of the PEM at high power, as would be useful for light duty vehicles or residential power systems.

d) The PEM can provide essentially instantaneous power from its associated battery; can begin producing its own power in a very short time; and can assist in starting the SOFC, thereby minimizing the battery storage requirements, which may be satisfied by a peaking device such as an ultracapacitor, for example.

e) The SOFC may be allowed to run continuously at low power, for perhaps several tens of thousands of hours, taking advantage of the waste heat to drive a highly efficient endothermic reforming process for the coproduction of $H_2$ for fueling the PEM and taking advantage of the lower grade exhaust heat for heating functions (fitting an efficient cost and function profile for an SOFC system).

f) The PEM is provided pure hydrogen for periodic operation of up to several thousand hours at high power levels, in typical residential or light duty vehicle applications, addressing the need for pure hydrogen fuel, and taking advantage of the high power and low cost potential of a PEM stack (while being realistic about its durability).

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A method for producing electricity, comprising the steps of:
   receiving hydrocarbon fuel;
   reforming said hydrocarbon fuel to produce a fuel gas in a reformer;
   separating the fuel gas into a first fuel stream containing hydrogen and carbon monoxide and a second fuel stream containing substantially pure hydrogen;
   providing the first fuel stream to a solid oxide fuel cell;
   operating the solid oxide fuel cell to provide a first source of electrical energy;
   storing the substantially pure hydrogen from the second fuel stream in a first hydrogen storage means;
   providing the substantially pure hydrogen to a proton exchange membrane fuel cell;
   operating the proton exchange membrane fuel cell to provide a second source of electrical energy;
   storing electrical energy from at least one of the first source of electrical energy and the second source of electrical energy in at least one electrical storage means; and
   delivering electrical energy from at least one of the proton exchange membrane fuel cell, the solid oxide fuel cell, and the at least one electrical storage means to an electrical load;
   wherein the proton exchange membrane fuel cell is operated as needed to provide a supplemental level of electric power to meet peak electrical power demands in excess of the electrical power provided by the solid oxide fuel cell and the at least one electrical storage means;
   wherein the at least one electrical storage means includes a first electrical storage means that is configured to store electrical energy from the first source of electrical energy and a second electrical storage means that is configured to store electrical energy from the second source of electrical energy;
   wherein the proton exchange membrane fuel cell, the second electrical storage means, and a second hydrogen storage means are incorporated into a vehicle and the solid oxide fuel cell, the first electrical storage means, and the first hydrogen storage means are incorporated into a stationary base that is connectable to said vehicle so as to provide hydrogen and/or electrical energy to said vehicle.

2. The method of claim 1 further comprising directing a first stream of anode effluent from the solid oxide fuel cell into the reformer such that said reforming proceeds endothermically.

3. The method of claim 2 where the solid oxide fuel cell is cooled by reforming a substantial part of the fuel within said solid oxide fuel cell.

4. The method of claim 1 further comprising combusting a second stream of anode effluent from the solid oxide fuel cell to produce heat.

5. The method of claim 1 wherein the first electrical storage means is configured to store electrical energy at a different voltage level than the second electrical storage means.

6. The method of claim 5 further including a bi-directional DC-DC converter in electrical communication with the first electrical storage means and the second electrical storage means such that either fuel cell and one electrical storage means can supply all or part of the power to loads and the other electrical storage means at a differing voltage level.

7. The method of claim 1 further comprising the step of exchanging heat between the vehicle and the stationary base so as to enhance the heating or cooling efficiency of a building or to maintain the fuel cell(s) at a preferred temperature by circulation of ducted air and/or coolant.

* * * * *